United States Patent
Scott et al.

(10) Patent No.: US 9,241,059 B2
(45) Date of Patent: Jan. 19, 2016

(54) CALLEE REJECTION INFORMATION FOR REJECTED VOICE CALLS

(71) Applicant: Telstra Corporation Limited, Melbourne (AU)

(72) Inventors: Andrew Ewart Scott, Melbourne (AU); Peter Scott Black, Melbourne (AU); David William Maxwell Reekie, Enfield (GB); Phillip John Rennie Pearl, Enfield (GB); James Edward Broughton, Enfield (GB); Douglas Gavin Currie, Enfield (GB)

(73) Assignee: Telstra Corporation Limited, Melbourne, Victoria (AU)

( * ) Notice: Subject to any disclaimer, the term of this patent is extended or adjusted under 35 U.S.C. 154(b) by 59 days.

(21) Appl. No.: 14/067,345

(22) Filed: Oct. 30, 2013

(65) Prior Publication Data

US 2014/0118465 A1    May 1, 2014

(30) Foreign Application Priority Data

Oct. 31, 2012   (AU) ................. 2012904788
Apr. 12, 2013   (AU) ................. 2013204656

(51) Int. Cl.
| H04M 3/64 | (2006.01) |
| H04M 1/725 | (2006.01) |
| H04M 1/253 | (2006.01) |
| H04M 1/64 | (2006.01) |

(52) U.S. Cl.
CPC ........ *H04M 1/72519* (2013.01); *H04M 1/2535* (2013.01); *H04M 1/642* (2013.01)

(58) Field of Classification Search
CPC .......... H04M 1/72519; H04M 1/2535; H04M 1/642; H04N 7/14

USPC .............. 348/14.01–14.03; 379/88.13, 88.16; 370/352

See application file for complete search history.

(56) References Cited

U.S. PATENT DOCUMENTS 5,946,381 A * 8/1999 Danne et al. ............. 379/142.07
6,459,780 B1   10/2002 Wurster et al.
(Continued)

FOREIGN PATENT DOCUMENTS

GB         2405053        2/2005
WO    WO2012078779        6/2012

OTHER PUBLICATIONS

Wiki—Routing document, 8 pages, dated Oct. 21, 2013.
(Continued)

*Primary Examiner* — Melur Ramakrishnaiah
(74) *Attorney, Agent, or Firm* — Nixon Peabody LLP

(57) ABSTRACT

A system includes a rejection module in a phone configured to receive calls over a network and a remote rejection announcement server (RAS) configured to receive calls over the network. The rejection module is configured to generate at least a portion of an incoming call user interface (UI) on the phone. The UI indicates incoming call signalling, associated with an incoming call from a caller, over a call signalling path in the network. One or more rejection options is provided for selection by a caller. Rejection reason data is generated based on selecting one of the rejection options. The rejection reason data is sent using a rejection reason path separate from the call signalling path. The remote RAS is configured to receive the incoming call from the caller, receive the rejection reason data over the rejection reason path, and generate an audio/video message based on the rejection reason data.

32 Claims, 9 Drawing Sheets

(56) References Cited

U.S. PATENT DOCUMENTS

| | | |
|---|---|---|
| 2005/0089149 A1* | 4/2005 | Elias .......................... 379/88.13 |
| 2005/0265318 A1* | 12/2005 | Khartabil et al. ............. 370/352 |
| 2008/0076395 A1* | 3/2008 | Bhatia et al. .................. 455/413 |
| 2008/0304470 A1 | 12/2008 | Ganganna |
| 2008/0304637 A1 | 12/2008 | Ganganna |
| 2010/0056120 A1* | 3/2010 | Olrog et al. ................... 455/415 |
| 2011/0105087 A1 | 5/2011 | Toebes et al. |
| 2012/0329494 A1* | 12/2012 | Champlin et al. ............ 455/466 |

OTHER PUBLICATIONS

IPFX—Mobile, 2 pages, dated Oct. 5, 2012, <www.ipfx.com/mobile.php>.

\* cited by examiner

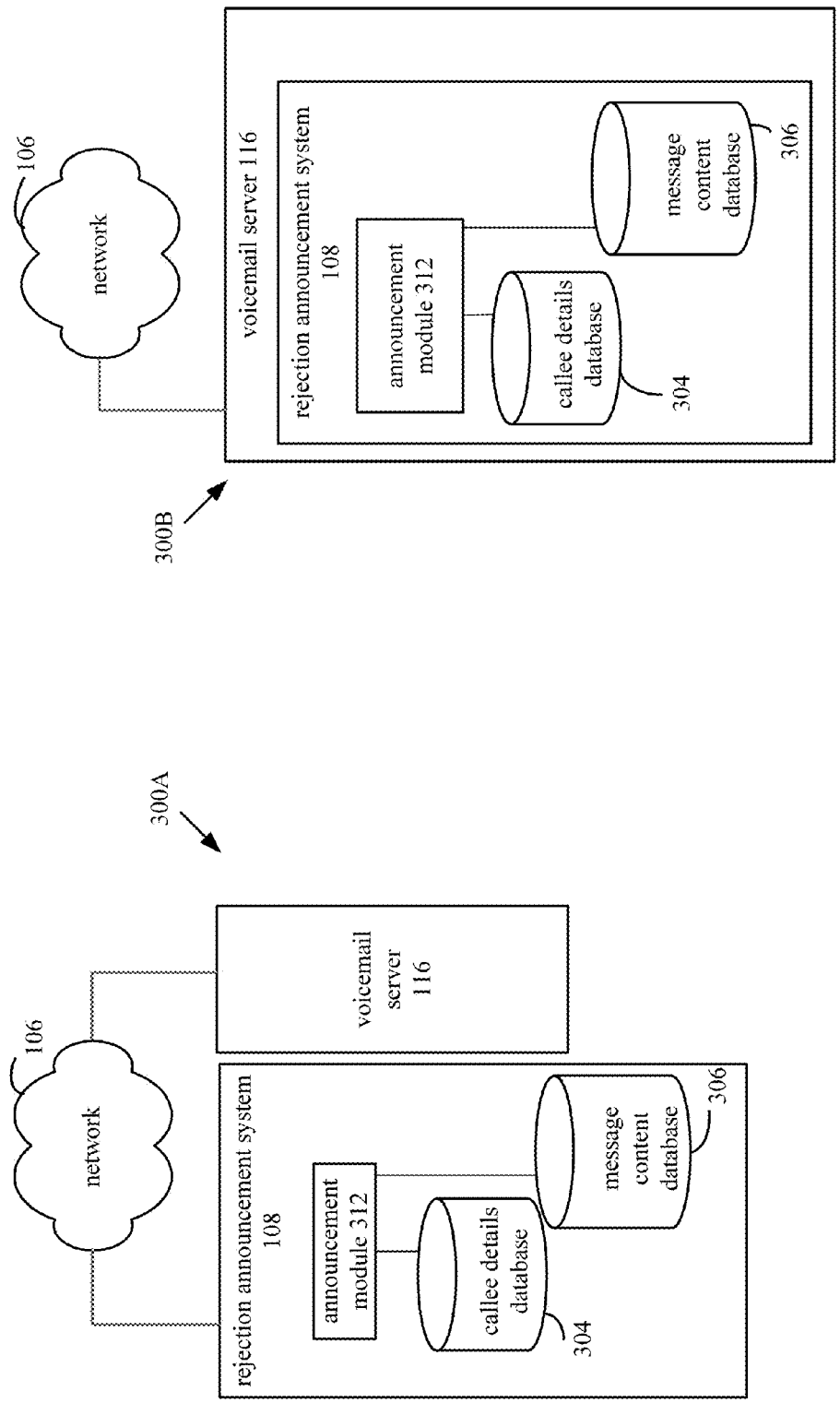

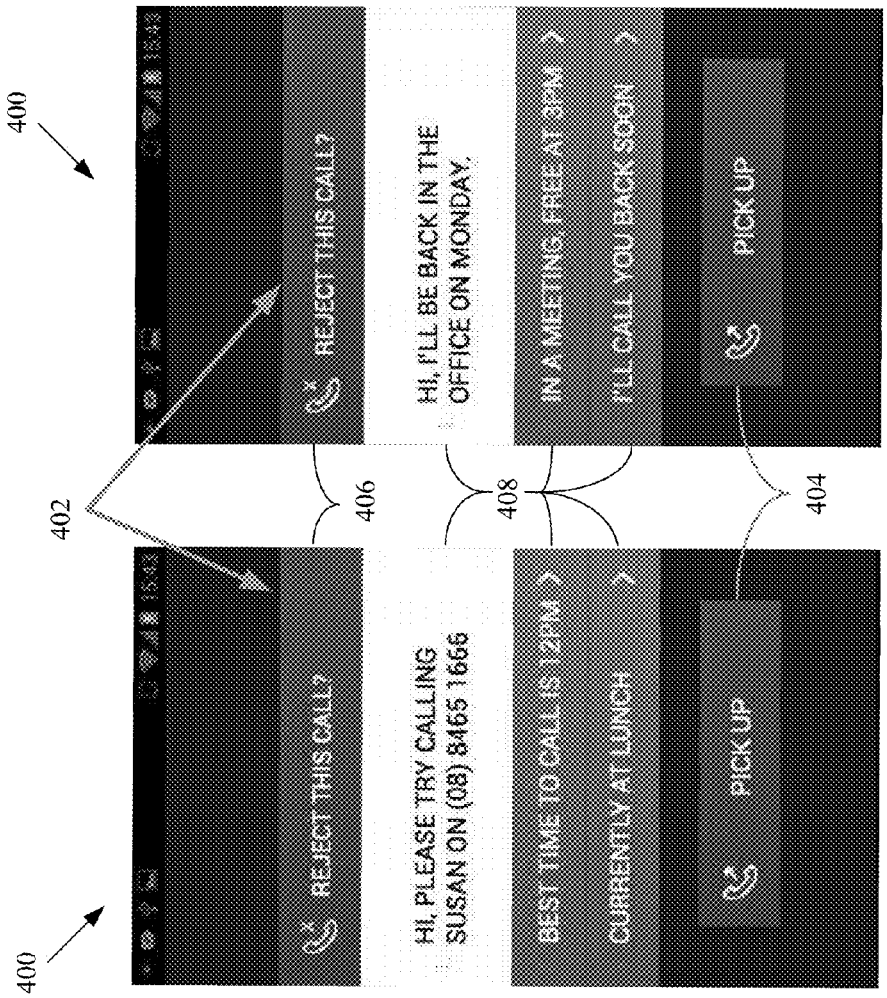
Figure 4B
Figure 4C
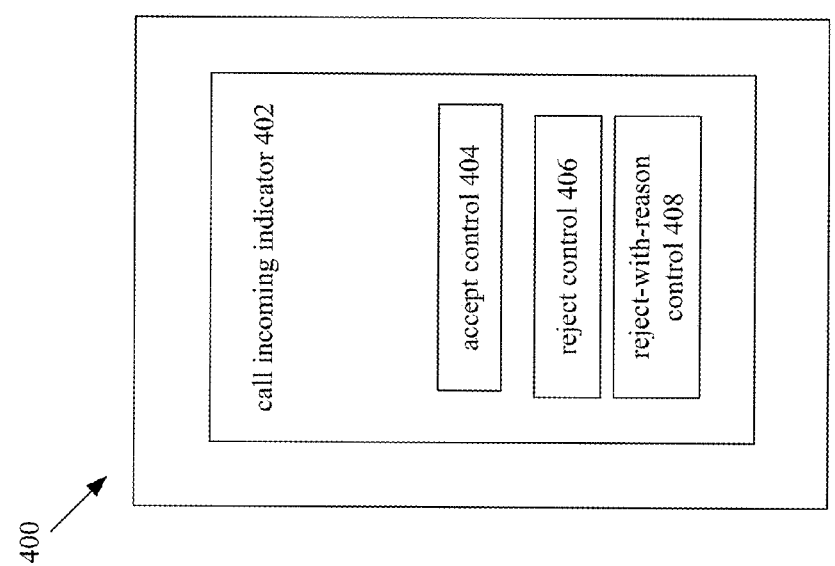
Figure 4A

CALLEE REJECTION INFORMATION FOR REJECTED VOICE CALLS

RELATED APPLICATIONS

The disclosures of the originally filed specifications of the following related applications are incorporated by reference herein in their entireties: Australian Provisional Patent Application No. 2012904788, filed 31 Oct. 2012, entitled "Callee Rejection Information For Rejected Voice Calls;" and Australian Patent Application No. 2013204656, filed 12 Apr. 2013, entitled "Callee Rejection Information For Rejected Voice Calls."

TECHNICAL FIELD

The present invention relates to communications systems, communications methods and computer-readable media for providing rejection information to a caller when voice calls to a phone are not answered by a user of the phone.

BACKGROUND

Telecommunications systems enable two parties at a distance (a caller calling a phone, and a callee using the phone) to establish a voice call for the purposes of exchanging information, reaching agreements and taking direction, etc., through an audio-based session or a video-based session. For such sessions or calls to be established, both the caller and the callee need to be in an appropriate state of readiness to conduct the call, with the caller proposing the call through dialing the callee, and the callee accepting the call, e.g., by lifting the receiver of a fixed phone (e.g., a phone on the public switched telephone network) or pressing the answer button on a mobile phone.

However, although a mobile phone network allows a person to receive a call almost anywhere, it also means that the phone can ring when the callee is not in a position to answer the call, such as when they are in a meeting, travelling, or otherwise indisposed, leaving the caller to, at best, record a voicemail message (which is also referred to as a voicemail) on the callee's voicemail system with the hope that at some point in the future the callee will listen to it.

If an incoming call is rejected by a callee, e.g., by pressing a hang-up button or by not answering the call in time, there is generally no context given to the caller on the callee's availability or when the voicemail might be listened to. The callee may be busy for hours in meetings, but the caller doesn't know. Consequently, there can be uncertainty for the caller about when the callee will be in a position to return the call. For an urgent matter, a caller may then attempt to contact the callee using additional methods, e.g., using text messages (also referred to Short Message Service—or SMS—messages), emails, instant messaging programs or further voice calls, and these can place additional burdens on the caller and/or the callee. For example, the callee might compose and send a text message back to the caller after rejecting their incoming call; however, this requires the callee to be able to compose the text message, which may be difficult in an active meeting or while travelling. Even if the callee automatically generates a text message reply (e.g., based on a pre-prepared message text), the caller will need to have a phone capable of receiving the text message, and the text message is likely to be read by the caller only after the call is finished, in which case the caller would fail to take the information in the text message into account immediately, e.g., when recording a voicemail message, or sending their own text message.

Existing applications (e.g., Office Communicator) can provide presence information to users, to help users understand whether a person is busy before making a call. However, these systems may be limited to seeing presence information only of people within the organisation, and require both users (caller and intended callee) to use the presence system. Furthermore, such systems fail to provide callee call-by-call control over how the presence information is shared with callers.

It is desired to address or ameliorate one or more disadvantages or limitations associated with the prior art, or to at least provide a useful alternative.

SUMMARY

In accordance with the present invention there is provided a system including a rejection module in a phone configured to receive calls over a network and a remote rejection announcement server (RAS) configured to receive calls over the network. The rejection module is configured to generate at least a portion of an incoming call user interface (UI) on the phone. The UI indicates incoming call signalling, associated with an incoming call from a caller, over a call signalling path in the network. One or more rejection options is provided for selection by a user of the phone. The rejection module generates rejection reason data based on selection of one of the rejection options. The rejection reason data is sent using a rejection reason path that is separate from the call signalling path. The remote RAS is configured to receive the incoming call from the caller, receive the rejection reason data over the rejection reason path, and generate, based on the rejection reason data, an audio/video message for the caller.

The present invention also provides a communications method that includes indicating incoming call signalling, associated with an incoming call from a caller, over a call signalling path in a network by generating at least a portion of an incoming call user interface (UI) on a phone. One or more rejection options is provided for selection by a user of the phone. Rejection reason data is generated based on selection of one of the rejection options. The rejection reason data is sent using a rejection reason path that is separate from the call signalling path. The incoming call from the caller is received at a remote rejection announcement system (RAS). The rejection reason data is received at the remote RAS over the rejection reason path. Based on the rejection reason data, an audio/video message is generated for the caller.

The present invention also provides computer-executable instructions stored in computer-readable storage for controlling one or more computer processors to execute the steps of the communications methods provided by the present invention.

Examples may provide a system including a rejection module in a phone configured to generate at least a portion of an incoming call user interface (UI) on the phone, the UI indicates an incoming call from a caller. The rejection module provides one or more rejection options for selection by a user of the phone, generates rejection reason data based on selection of one of the rejection options, and sends the rejection reason data. The system includes a rejection announcement system (RAS) configured to receive the rejected call, receive the rejection reason data, and generate, based on the rejection reason data, an audio/video message for the caller. The rejection module is configured to generate the rejection options and/or the rejection reason data based on callee availability data, representing when the callee is available, which is generated using calendar data from the phone.

Examples may also provide a system including a rejection module in a phone and a rejection announcement system (RAS) in the phone. The rejection module is configured to generate at least a portion of an incoming call user interface (UI) on the phone. The UI indicates an incoming call from a caller. The rejection module is further configured to provide one or more rejection options for selection by a user of the phone, redirect the incoming call to the RAS in response to selection of one of the rejection options, and generate rejection reason data based on the selected rejection option. The RAS is configured to receive the redirected call, receive the rejection reason data, and generate, based on the rejection reason data, an audio/video message for the caller.

Examples may also provide a communications method including generating at least a portion of an incoming call user interface (UI) on a phone, said UI indicating an incoming call from a caller. One or more rejection options is provided for selection by a user of the phone. Rejection reason data is generated based on selection of one of the rejection options. The rejection reason data is sent to a rejection announcement system (RAS). The rejected call and the rejection reason data is received by the RAS. Based on the rejection reason data, an audio/video message is generated for the caller. The rejection options and/or the rejection reason data are generated based on callee availability data, representing when the callee is available, which is generated using calendar data from the phone.

Other examples may provide a communications method including generating at least a portion of an incoming call user interface (UI) on a phone. The UI indicates an incoming call from a caller. One or more rejection options is provided for selection by a user of the phone. The incoming call is redirected in response to selection of one of the rejection options. Rejection reason data is generated based on the selected rejection option. The rejection reason data is sent to a rejection announcement system (RAS) in the phone. The redirected call and the rejection reason data is received by the RAS. Based on the rejection reason data, an audio/video message is generated for the caller.

BRIEF DESCRIPTION OF THE DRAWINGS

Preferred embodiments of the present invention are hereinafter further described, by way of example only, with reference to the accompanying drawings, in which:

FIG. 3A is a block diagram of a separate-RAS configuration in the communications system of FIG. 1A;

FIG. 3B is a block diagram of a RAS-in-voicemail configuration in the communications system of FIG. 1B;

FIG. 4A is a diagram of a user interface of the callee telephone;

FIGS. 4B and 4C are screen shots of example user interfaces of the callee telephone.

DETAILED DESCRIPTION

Overview

Figure 1A:
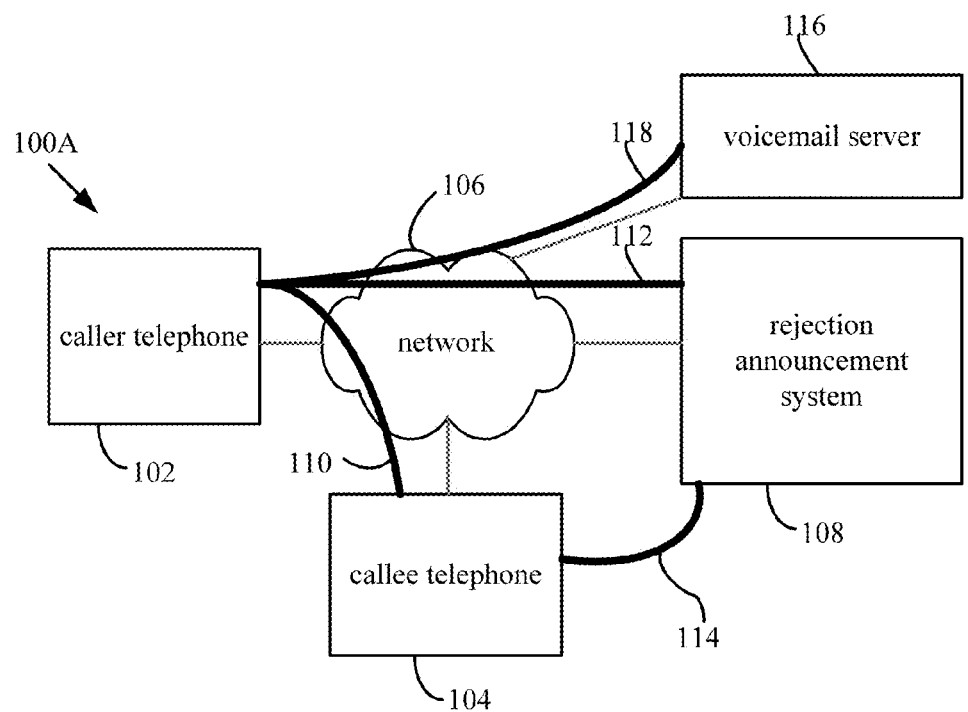
FIG. 1A is a block diagram of a communications system with a rejection announcement system (RAS) separate from a voicemail server and a callee telephone.

Described herein is a system including a call rejection module and a rejection announcement system (RAS). The call rejection module is in a user's phone. The RAS may be in the phone or remote from the phone. The call rejection module is configured to: generate at least a portion of an incoming call user interface (UI) on the phone, said UI indicating an incoming call from a caller (by indicating receipt of incoming call signalling, associated with the incoming call from the caller, from a network over a call signalling path), and providing one or more rejection options for selection by a callee (i.e., the user of the phone), reject the incoming call (or cause the incoming call to be redirected), in response to selection of one of the rejection reason options, and generate rejection reason data based on the selected rejection option and available data from the phone. Rejecting the incoming call can be referred to as "redirecting" the call or "diverting" the call, and this can be either active (the phone sends a voice rejection signal to the network, over a voice-rejection path that may be the same as the call signalling path, to redirect the call to the remote RAS; or the rejection module sends a signal to the in-phone RAS to accept the call on the phone), or passive (the network redirects the call if it not answered within a preselected answer time). The RAS is configured to: receive and accept the rejected or redirected call, receive the rejection reason data over the rejection reason path in the network, generate an audio/video message based on the rejection reason data, and play the audio/video message for the caller of the call.

The selection of one of the rejection options can include receiving a user input from the UI corresponding to a rejection control (e.g., a button or a list item, or an available option in a grammar of a speech recognition module or service) of the UI. The rejection control can be generated based on rejection options data representing a label for the rejection control. The rejection reason data can be generated based on the rejection options data representing a corresponding rejection message for the audio/video message. The rejection options data can be generated by the rejection module in the phone in preparation for providing the rejection control, whereas the rejection reason data can be generated after selection of one of the rejection options.

The available data used to generate the rejection reason data and/or the rejection option data can include any one or more of:

callee availability data representing when the callee is available, e.g., in diary data or calendar data stored or provided by the phone (e.g., calendar entries);

predefined message data representing predefined rejection messages preselected by the user (e.g., "I will call back tomorrow", or "please call my office number");

personal contact data available on the phone;

location data available on the phone representing a current location of the phone (e.g., from a global positioning system);

status data available on the phone representing a current status of the callee (e.g., from a social networking system, or an out-of-office service, e.g., provided by Microsoft's "Outlook"); and presence data available on, in or from the phone (e.g., accessed from a presence server) representing a presence of the callee.

The RAS can be configured to generate the audio/video message based on logical selection rules that associate a received rejection message (e.g., representing a current meeting in the calendar) with audio/video message content (e.g., a message saying "the callee is currently in a meeting").

The generated portion of the UI can be an entire UI or a UI enhancement (e.g., an additional button or rejection option) for an existing UI (e.g., a native call-receiving UI of the phone).

The UI can be generated using a display of the phone (for visual aspects), or using a speaker (for audible aspect) or a vibrator (for tactile aspects). The UI can receive input from the callee to select one of the rejection options manually (e.g., using buttons on the phone, such as soft buttons or hard buttons, or moving the phone by shaking or turning it) and/or verbally (e.g., using a speech recognition service, such as Apple's "Siri").

The available data from the phone may be stored in the callee phone, and/or may be available to the phone from a remote server, e.g., via a cloud service, based on authentication data in the phone. For the remote data on a remote server, the phone accesses the remote data to at least temporarily store the available data, and the call rejection module accesses the available data from the phone. The available data may be synchronised with the remote data by a synchronisation module or service in the phone. An example may be remote availability data in a cloud calendar (e.g., Google's "Calendar") that is made available from the phone.

The call rejection module is configured to detect the incoming call over a network that is configured to carry audio and/or video connections and associated signalling to establish these connections. The network supports: audio-specific channels using protocols and network infrastructure configured specifically for audio-only voice communications; and/or video-specific channels using protocols and network infrastructure configured specifically for combined audio-video communications. The incoming call signalling can thus represent a request for an audio call (also referred to as a "voice call") or a video call (which includes audio and video). The network can include:
  (a) a packet-switched network, e.g., based on: the Internet Protocol (IP); Voice over Internet Protocols (VoIP) including the Session Initiation Protocol (SIP), the Real-time Transport Protocol (RTP), the Gateway Control Protocol ("H.248" from the International Telecommunication Union's Telecommunication Standardization Sector), the Skype Protocol; or a fourth generation (4G) mobile phone standard; and/or
  (b) a circuit-switched network supporting circuit connections according to International Telecommunication Union (ITU) protocols, e.g., based on second generation (2G) or third generation (3G) mobile phone standards, or a Public Switched Telephone Network (PSTN).

The signalling is carried over paths in the network. For a remote RAS, the rejection reason data may be sent by the call rejection module to the remote RAS using either: (1) a rejection reason path that is the same as the call signalling path; or (2) a rejection reason path that is separate from the call signalling path. The rejection reason path can be the same as the call signalling path by reconfiguration of the network communications protocols, e.g., by adding additional data to the signalling message (e.g., by extending the SIP protocol in a packet-switched network, or by extending the protocols in a circuit-switched network). In a circuit-switched network, the call signalling path is the network path used for the incoming call signalling, and for the voice rejection signal if the call is rejected. In a packet-switched network, the call signalling path is defined by the VoIP session. Using the same path for the rejection reason data and the call signalling may be referred to as "in-band signalling". The separate rejection reason path may be implemented using a web-services interface, as described hereinafter. The separate rejection reason path may use the existing network protocols to communicate directly with the remote RAS, e.g., by attempting to establish a separate voice call with the RAS, e.g., using the PSTN, in which case the remote RAS is configured to detect the signalling in the call from the callee phone and receive the rejection reason data in the call signalling associated with the call from the callee phone. Having a rejection reason path that is separate from the call signalling path (i.e., using a separate network path for communication between rejection module and the RAS) can allow for easier implementation because no reconfiguration or adaption of the standard network communications protocols is required. Using the different path for the rejection reason data and the call signalling may be referred to as "out-of-band signalling".

The communications system may be configured to have the RAS implemented: (i) in the phone (the callee's phone); (ii) in a voicemail system that is remote from the phone and configured to receive voicemail from the caller; or (iii) in a separate and remote rejection announcement platform. In the configuration with the RAS in the phone, the call is accepted on the callee's phone for the purpose of playing the rejection announcement prior to the call being redirected to a voicemail server in the voicemail system. In the configuration with the remote RAS, a rejected call can be redirected by the voice network to the remote RAS using standard protocols and networking equipment. The rejected call may be actively rejected by the phone sending a rejection signal (also known as a call diversion signal) to the network over the voice-rejection path. The rejected call may be passively rejected by the phone failing to answer the call within a preselected pick-up time (e.g., a ring time defined for the callee phone number in the network), and the network itself then redirecting (or "diverting") the passively "rejected" call to the remote RAS. The rejected call may be redirected to the remote RAS by the voice network using standard network protocols.

Systems

Figure 1B:
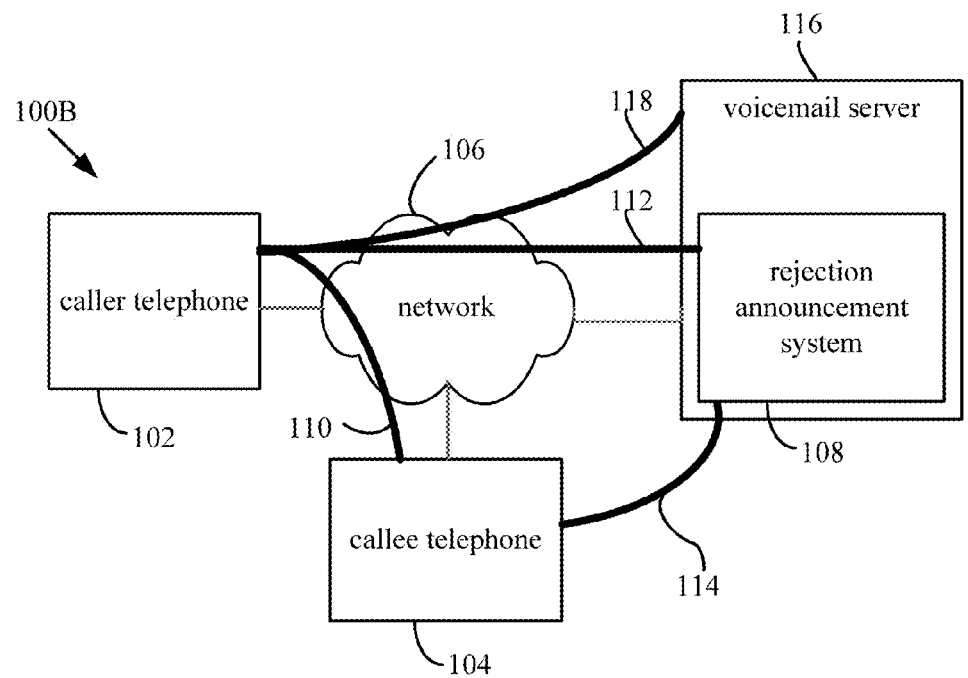
FIG. 1B is a block diagram of a communications system with the RAS in the voicemail server.
Figure 1C:
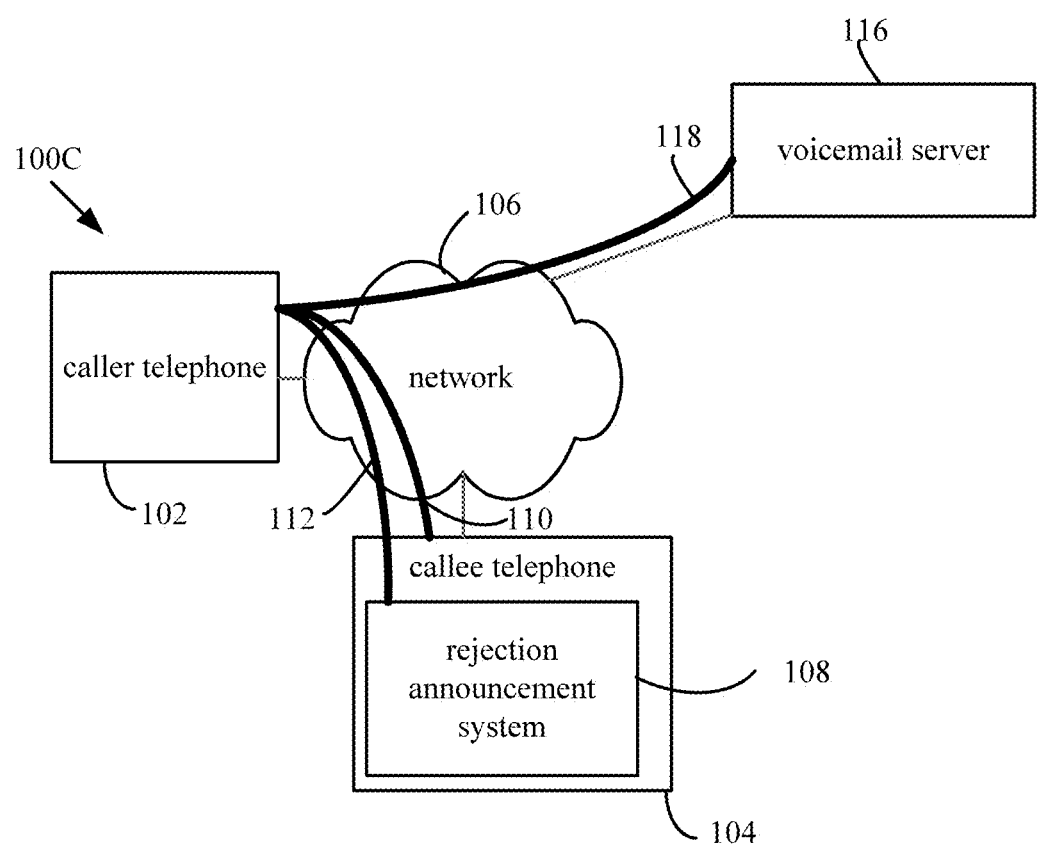
FIG. 1C is a block diagram of a communications system with the RAS in the callee telephone.

Communications systems 100A, 100B, 100C for providing rejection information, for a caller when an incoming call is rejected, can be deployed in different arrangements or configurations, as shown in FIGS. 1A to 1C. The communications systems 100A, 100B, 100C include a caller phone 102 operated by a person (referred to as a "caller") making a telephone call. The caller phone 102 is connected (by communication means) to a network 106, which in turn connects to a callee telephone 104. The callee telephone 104 is connected to the caller telephone 102 by the network 106 after the caller initiates the call. The network 106 can include a voice network (providing voice-specific channels) and a video network (providing video-specific channels).

The communications systems 100A, 100B, 100C each include a rejection announcement system (RAS) 108 which can connect to the caller phone 102 using the network 106 after the call has been responded to by the callee phone 104. The communication systems 100A, 100B, 100C, may include a voicemail server 116 which can connect to the caller phone 102 using the network 106 after the call has been treated by the RAS 108.

In general, during operation of the communications systems 100A, 100B, 100C, the network 106 attempts to establish a voice connection 110 (audio and/or video) between the caller phone 102 and the callee phone 104. If the call is rejected with a reason as described hereinafter, the communications systems 100A, 100B, 100C redirect the call to establish a voice connection 112 between the caller phone 102 and the RAS 108. A data connection 114 is provided between the callee phone 104 and the RAS 108 (for systems 100A and 100B), or between components or modules in the callee phone 104 and the RAS 108 implemented as another component or module in the callee phone 104 (for system 100C). The nature of the data connection 114 differs based on the location of the RAS 108 which can be in the phone in the system 100C, or remote from the phone in systems 100A and 100B. For the remote RAS 108 (in systems 100A and 100B), the data connection 114 is formed as a path in the network 106 (this path is referred to as the "rejection reason path"). The nature of the rejection reason path differs based on the configuration of the network. For a circuit switched portion of the network 106 (which may comprise the entire network 106 in some embodiments), the data connection 114 and the rejection reason path are formed by forming circuit connections through the network 106. For packet-switched portions of the network 106 (which may comprise the entire network 106), the data connection 114 and the rejection reason path can be routed through the network 106, e.g., using a network address for the remote RAS 108. For the remote RAS 108 systems 100A and 100B, the callee telephone 104 can send the voice rejection signal into the network 106 based on circuit-switched protocols (e.g., PSTN, mobile 2G or mobile 3G) or using packet-switched protocols (e.g., VoIP protocols, such as SIP) over a voice-rejection path defined by the network protocols. In the remote-RAS systems 100A and 100B, the network 106 establishes a call signalling path to the callee phone 104 to transmit the incoming call signalling, based on the circuit-switched protocols or the packet-switched protocols of the network 106 (depending which protocols connect the callee phone 104 to the network 106). The rejection reason path, and the data connection 114, used by the call rejection module 202 can be separate from and independent from the call signalling path and the voice-rejection path, thus allowing sending of the rejection reason data from the callee phone 104 to the remote RAS 108 without requiring adjustments of or additions to the circuit-switching protocols or the packet-switching protocols that are pre-existing in the network 106, and specifically the portions of the network 106 that connect to the callee phone 104 and to the remote RAS 108. In the systems 100A and 100B, the independent and separate rejection reason path can be formed and accessed using non-VoIP protocols, e.g., IP addressing and data formatted according to a schema, such as XML schema formatted for interpretation by the remote RAS 108, or Web-services etc, as described hereinafter. As mentioned hereinbefore, using the separate rejection reason path can be referred to as "out-of-band signalling", and using a rejection reason path that is coincident with the call signalling path (in particular the voice-rejection path), can be referred to as "in-band signalling". The out-of-band signalling can use standard network protocols to carry the rejection reason data over the data connection 114, e.g., IP addressing, the Extensible Messaging and Presence Protocol (XMPP), the Simple Mail Transfer Protocol (SMTP), the SIP, a Web-services Application Programming Interface (API)—based on the Voice eXtensible Markup Language (VXML) or the Call Control eXtensible Markup Language (CCXML)—for the interface to the RAS 108, and the Parlay X APIs for the interface to the call rejection module 202.

System 100A is a separate-RAS system that includes the rejection announcement system (RAS) 108 connected to the voice network 106 and implemented separately from the callee phone 104 and from the voicemail server 116, as shown in FIG. 1A. The separate RAS 108 can be provided in a dedicated computing platform or in processors of a cloud system. The caller phone 102 can be connected to the RAS 108 through the network 106 if the callee phone 104 rejects the call. The network 106 redirects rejected calls to the RAS 108. The RAS 108 can be remote from the caller phone 102 and the callee phone 104, e.g., located in a central network location, and in this case the RAS 108 is referred to as a remote RAS.

System 100B is a RAS-in-voicemail system that includes the RAS 108 implemented on or in the voicemail server 116 and connected to the network 106 using the voicemail server 116. The caller phone 102 can be connected to the RAS 108 through the network 106 and through the voicemail server 116 if the callee phone 104 rejects the call and the network 106 redirects the rejected call to the voicemail server 116. The RAS 108 and voicemail server 116 may be referred to as being remote from the callee phone 104.

System 100C is a RAS-in-phone system that includes the RAS 108 implemented on or in the callee phone 104. The RAS 108 is thus connected to the network 106 using the callee phone 104. The caller phone 102 can connect to the RAS 108 through the network 106 and the callee phone 104. If call-receiving modules in the callee phone 104 reject the call, these modules redirect the rejected call to the RAS 108 internal to the callee phone 104.

The network 106 can include:
(a) a packet-switched IP network, operating on a VoIP protocol (e.g., SIP/RTP, H248 or Skype) and the callee phone 104 can include a VoIP client configured to receive the call (the caller phone 102 can be a standard phone, e.g., a mobile/cellular telephone, or another VoIP client);
(b) a circuit-switched telephony network including other network standards, (e.g., ITU protocols) e.g., a Public Switched Telephone Network (PSTN), a Integrated Services Digital Network (ISDN), a video calling network, etc, that provide one or more of the connections 110, 112, 118;
(c) mobile circuits of a telephony network connecting the caller phone 102 and the callee phone 104; and
(d) a packet-switched data connection between the callee phone 104 and the announcement system 108.

The callee phone 104 can be a smart phone from a commercial manufacturer, e.g., one of Apple's "iPhone" phones, Samsung's "Galaxy" phones, Google's "Nexus" phones, etc. The callee phone 104 can be a cellular or mobile handset. The callee phone 104 may be a portable computing device: e.g., a tablet computer (e.g., Apple's "iPad", or Samsung's "Galaxy Tab"), a notebook computer, a laptop computer, etc. The callee phone 104 may be a desktop computing apparatus, e.g., a commercially available personal computer, Apple's "Mac", Lenovo's "THINKPAD", etc. The callee phone 104 can be a combined voice-and-data apparatus, e.g., Telstra's "T-Hub", which includes a PSTN connection and a data connection. The callee phone 104 can be a single device, or a plurality of connected devices, e.g., a mobile handset with a Bluetooth controller.

The voicemail server 116 can be implemented in a stand-alone voicemail platform or in servers provided by a cloud system.

Figure 2:
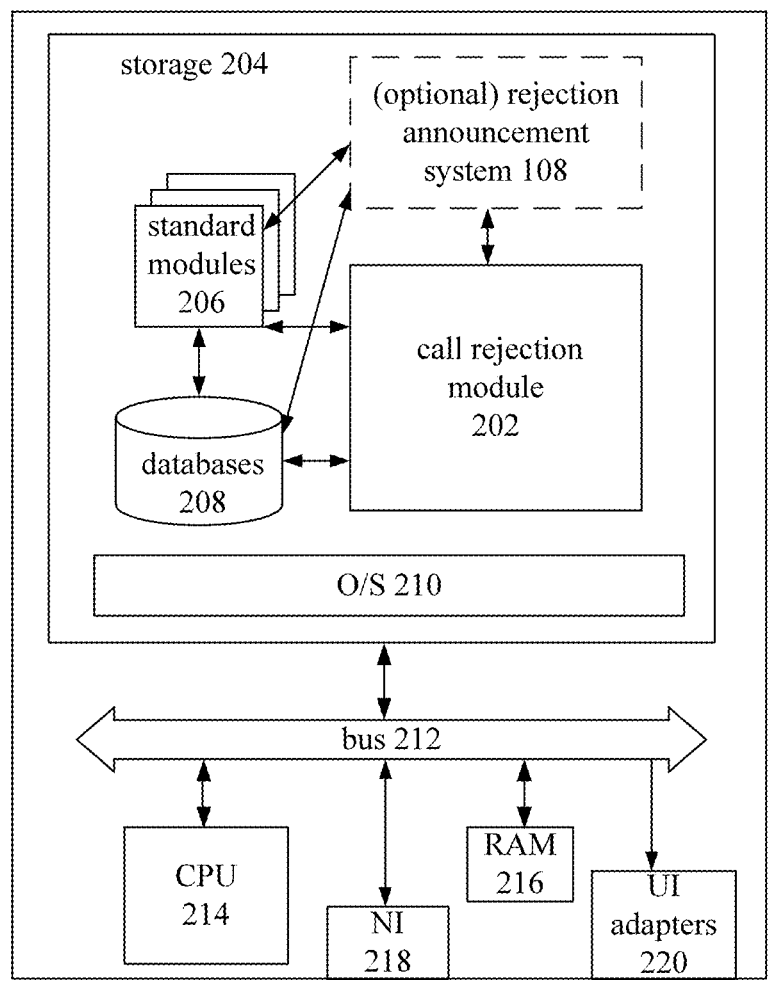
FIG. 2 is a block diagram of the callee telephone in the communications system.

The callee phone 104 includes a call rejection module 202 stored in storage 204 of the callee phone 104, as shown in FIG. 2. The storage 204 can be a non-volatile memory, such as a hard disk and/or a flash memory chip(s).

The storage 204 stores commercially available modules 206, which are standard modules (also referred to as "services") installed in the callee phone 104, e.g., mobile phone apps from Apple's "App Store", or Google's "Play" service. The standard modules 206 on the callee phone 104 can generate the available data for the call rejection module 202 and can include any one or more of the following:

a native call-receiving module (e.g., for providing data representing an identifier of the caller, such as a telephone number of the caller phone 102);

diary or calendar modules for providing availability data (e.g., Android Calendar);

email modules (e.g., Microsoft's "Outlook"), for providing data representing out-of-office messages;

social networking modules (e.g., from Facebook or Twitter), for providing data representing a social network status or location;

personal contact modules (e.g., an address book module), for providing data representing contact names or numbers;

location modules (e.g., in communication with Global Positioning Systems or other location services), for providing geo-location data; and presence modules (e.g., from IPFX Limited), for providing data representing presence.

The standard modules 206 can include, or can at least access, one or more databases 208 (which represent any data stored by the standard modules 206) in the storage 204, e.g., containing data associated with the standard modules 206, e.g., representing calendar entries, personal contacts, current location, a current status (e.g., in a social networking system), a presence indicator, etc. The databases 208 are accessed by the standard modules 206 during operation of the callee phone 104.

In the RAS-in-phone system 100C, the storage 204 also includes the RAS 108, and data connections between the RAS 108 and each of the standard modules 206, the databases 208 and the call rejection module 202.

In operation, the call rejection module 202 accesses one or more of the databases 208 to access the data stored by the standard modules 206, or accesses the standard modules 206 via their respective interfaces (e.g., Application Programming Interfaces, or APIs) to access the data of the standard modules 206.

The call rejection module 202 also accesses the databases 208 to record and store preferences data (also referred to as configuration data) associated with the call rejection module 202 itself. The preferences data can include user preferences based on user input data from the callee e.g., to configure or personalise the call rejection module 202. The preferences data can include rejection options data representing name (also referred to as an identifier), a display or play label (e.g., a visual label for one of the rejection controls described hereinafter with reference to FIGS. 4A to 4C, or an audible label for an audio UI), and the corresponding rejection message for the announcement system 108. The preferences data may control whether the RAS 108 is configured, e.g., using internal settings, to not use voicemail, and thus terminate a call rather than redirecting it to the voicemail server 116 after the audio/video message playout.

In the RAS-in-phone system 100C, the RAS 108 may be combined in a single application (app) in the callee phone 104. The app may allow the callee to view and amend the preferences data, and the RAS 108 may also access the preferences data to control its operation (e.g., whether to terminate calls rather than redirecting them to the voicemail server 116).

The call rejection module 202 is configured to accept or reject incoming voice calls based on input from the callee (i.e. the user of the callee phone 104). If the call rejection module 202 accepts a call, the call is connected to the callee phone 104 using standard signalling and telephony modules, and the callee and caller can talk to each other using the speakers and microphones of their respective phones (the callee phone 104 and the caller phone 102 respectively).

The call rejection module 202 is configured to generate and send call rejection reason data representing information about the reasons for rejection. The RAS 108 is configured to receive and accept the rejected calls, and receive the rejection reason data from the call rejection module 202.

As shown in FIG. 2, the callee phone 104 includes the following computing modules and components: a commercially available operating system 210 in the storage 208, and a commercially available bus 212 connecting the storage 204 to the other components of the callee phone 104. The other components can include at least one commercially available central processing unit (CPU) 214, one or more commercially available random access memory (RAM) modules 216, one or more commercially available network interface (NI) component(s) 218, and one or more commercially available user interface (UI) adapters 220 connected to at least one display device, at least one speaker device, and at least one user-input device of the callee phone 104. The NI component 218 is configured to connect the callee phone 104 to the network 106, e.g., commercially available voice and/or data communications protocols. The display device can be a commercially available liquid crystal display (LCD), the speaker device can be a handset or Bluetooth speaker, and the user-input device can be a keyboard, buttons or voice-input device (a microphone). The display and user-input devices can be a touch-screen display configured to display information to the callee and to receive manual input from the callee.

Figure 3C:
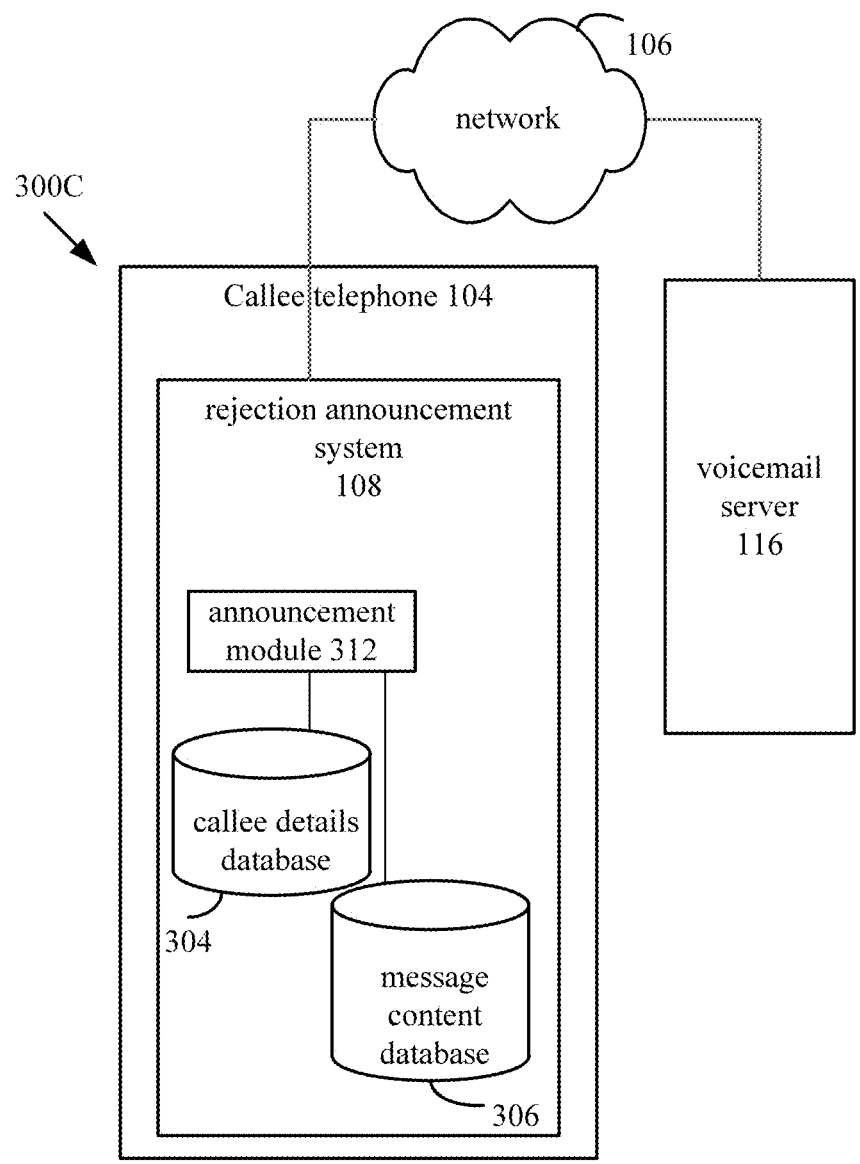
FIG. 3C is a block diagram of a RAS-in-phone configuration in the communications system of FIG. 1C.

In the respective system configurations 100A, 100B, 100C described hereinbefore, the RAS (RAS) 108 is implemented as a separate standalone system in a separate-RAS configuration 300A, as shown in FIG. 3A, or as part of the voicemail server 116 in a RAS-in-voicemail configuration 300B, as shown in FIG. 3B, or as part of the callee phone 104 in a RAS-in-phone configuration 300C, as shown in FIG. 3C.

As shown in FIGS. 3A to 3C, the RAS 108 includes an announcement module 312, at least one callee details database 304 containing data representing callee details, and a message content file store or database 306 containing data representing message contents. The announcement module 312 can connect to the at least one callee details database 304 for accessing the callee details. The announcement module 312 can connect to the message content database 306 to generate audio announcements. The message content database 306 may include the message content stored as audio data representing pre-recorded messages. The message content database 306 may also include text data representing text content that the announcement module 312 can use to generated audio/video messages using a text-to-speech function or module in the announcement module 312, the RAS 108, the callee phone 104, the voicemail system 116, or provided by an external computing service (e.g., in a cloud system).

In the separate-RAS configuration 300A, the RAS 108 (referred to as a "separate RAS") is configured to receive and accept the redirected call and to play the audio/video message for the caller phone 102, and the separate voicemail server 116 is configured to receive the voicemail from the caller phone 102 separately. In the separate-RAS configuration 300A, as shown in FIG. 3A, both the RAS 108 and the separate voicemail server 116 are connected to at least the voice network in the network 106. After the audio/video message is played to the caller, the call is redirected from the RAS 108 to the voicemail server 116 over the voice network of the network 106. In the separated system 300A, the RAS 108 includes the announcement module 312, and commercially available announcement system components (e.g., a Cisco Unified IP IVR, or Voxeo Prophecy). The audio/video message can be a pure audio message, e.g., as provided by the commercially available announcement system components. The voicemail server 116 includes commercially available voicemail hardware.

In the RAS-in-voicemail configuration 300B, as shown in FIG. 3B, the voicemail server 116 and the RAS 108 (referred to as a "in-voicemail RAS") are combined in the same platform or server. In the RAS-in-voicemail configuration 300B, the voicemail server 116 is configured to receive and accept the call redirected from the callee phone 104, play an audio/video message for the caller using the RAS 108, and receive a voicemail from the caller. In the RAS-in-voicemail configuration 300B, the rejection voicemail server 116 includes commercially available hardware for voicemail systems (e.g., a Comverse NGVM, or Metaswitch Metasphere voicemail server).

In the RAS-in-phone configuration 300C, the RAS 108 (referred to as an "in-phone RAS") is provided in the callee phone 104. This RAS 108 in the callee phone 104 is configured to receive and accept the call and to play the audio/video message for the caller. The voicemail server 108 is separate and configured to receive the voicemail from the caller. In this configuration 300C, calls rejected with a reason are connected by the callee phone 104 directly to the reject announcement system 108, without any audio interaction with the callee user (i.e., there is no use of the microphone nor speaker when delivering the audio/video message to the caller phone 102). The RAS 108 plays out the reject announcement to the caller. After the audio/video message is played to the caller, the call is redirected from the callee phone 104 to the voicemail server 116 over the network 106. In this configuration, the RAS 108 and the call rejection module 202 may be implemented as a single application (app) for installation on the callee phone 104.

The call rejection module 202 includes processor-executable data representing executable instructions that are processed by the CPU 214 to generate at least a portion of an incoming call user interface (UI) 400 on the display of the callee phone 104. The UI 400, as shown in FIGS. 4A to 4C, includes a call incoming indicator 402 indicating that a call from the caller phone 102 is incoming. The call incoming indicator 402 can include a visible indicator, e.g., words and/or symbols appearing on the screen of the callee phone 104, and/or audible and/or tactile indicators, e.g., a ringing noise and/or a vibrating motion. The UI 400 includes the controls, generated using the rejection options data, for a plurality of response options, which include rejection options, for selection by the callee. The response controls can include at least one accept control 404, which, when selected by the callee, connects the incoming voice call. The response controls can include at least one reject control, e.g., a straight reject control 406 and a reject-with-reason control 408. In configurations 300A and 300B, when the reject-with-reason control 408 is selected by the callee, it causes the call rejection module 202 to reject the voice call from the callee phone 104 (and the network 106 to redirect the call to the RAS 108), and send the callee rejection reason data from the callee phone 104 to the announcement module 312. In configuration 300C, when the reject-with-reason control 408 is selected by the callee, the call is accepted by the callee phone 104 and redirected to the in-phone RAS 108.

The generated portion of the UI 400 may be just the additional rejection control, and the remainder of the UI 400 (e.g., including the accept control 404 and the straight reject control 406) may be generated by one of the standard modules 206 (e.g., a native call-receiving UI of the phone). Thus the generated portion may be referred to as an enhancement rather than a complete user interface. In this way, standard accept and reject controls controlled by a standard call receiving module could be enhanced with the reject-with-reason control 408 controlled by the call rejection module 202.

The UI 400 can include indicators associated with the respective response option controls, e.g., virtual buttons appearing on a touch-screen interface that can be manually selected by the callee. The controls for receiving the selection from the callee can include input mechanisms available in the callee phone 104, e.g., input through a touch-screen, keyboard, verbal input through speech-recognition system, accelerometer input caused by manual movement of the phone, etc. The accept control 404 and reject controls 406, 408 can include soft buttons (on a touch screen) or hard buttons (on a keypad or elsewhere on the callee phone 104). The reject-with-reason control 408 could be layered visually over another control, e.g., a reject button could be held down to select one or more reject-with-reason controls 408.

The indicators of the response options, and the options' respective controls, can be generated based on the user preferences data and the rejection options data of the call rejection module 202. For example, a user may configure the call rejection module 202 to provide a plurality of reject options, and respective reject-with-reason controls 408, using the user preference data: one of the reject options can cause the call rejection module 202 to generate rejection reason data based on diary data or calendar data in the databases 208 or accessed in a cloud server.

The callee availability data may be stored on the callee phone, and/or may be stored in the cloud and accessed as needed or synchronised from the cloud. The phone may be synchronised with the cloud, or the phone may have visibility of the cloud calendar. In either case, the phone provides the callee availability data, and the call rejection module accesses this data in the phone.

The rejection options data represent which rejection options are provided to the callee when the incoming call is detected, the content of each rejection option, and what rejection message is associated with each rejection option. The rejection options data can represent the labels of the reject-with-reason controls shown or announced by the UI 400, e.g., the text of the options 408 shown in FIGS. 4B and 4C. The rejection options data also represent the rejection messages corresponding to the labels. For example, as shown in FIG. 4B, example labels of the provided rejection options can be (i) "HI, PLEASE TRY CALLING SUSAN ON (08) 8465 1666"; (ii) "BEST TIME TO CALL IS 12 PM"; and (iii) "CURRENTLY AT LUNCH". These example labels can have the following corresponding example rejection messages defined in the rejection options data: (i) "I'm busy, please contact Susan on 8465 1666"; (ii) "Hi, the best time to call me is 12 p.m."; and (iii) "Hi, I am currently at lunch". The example rejection messages (or at least a code representing the rejection message that the RAS 108 is configured to decode to generate the rejection message, e.g., using a code dictionary defining available message content portions) are stored in the rejection options data, and when one of the controls is selected, the corresponding example rejection message is sent in the rejection reason data to the announcement system 108. Other example labels stored in the rejection options data can include "HI, I'LL BE BACK IN THE OFFICE ON MONDAY.", "IN A MEETING, FREE AT 3 PM", "IN BACK-TO-BACK MEETINGS, FREE AFTER 4 PM", and "I'LL CALL YOU BACK SOON", etc. Other example rejection messages stored in the rejection options data (in association with respective example labels) can include "[NAME] is on a call", "[NAME] is on leave", or "[NAME] is overseas", etc., where "[NAME]" refers to the name of the callee extracted from the user preferences data.

A user can configure their communications device to be an embodiment of the callee phone 104 by installing software that provides the call rejection module 202, e.g., by downloading and installing a software application on a smart phone or mobile handset. As mentioned previously, the call rejection module 202 can be a VoIP client, and can be written using a commercially available programming language (e.g., JAVA or Objective C) and compiled for a commercially available operating system (e.g., iOS, Android).

The announcement module 312 includes processor-executable data representing executable instructions stored in the RAS 108. These instructions are processed by one or more CPUs. The RAS 108 can include commercially available text-to-speech systems and systems to map portions of the received rejection message to pre-recorded audio content/sounds/announcements (e.g., if the person is free in 27 minutes, this could be mapped to 30 mins, and the system could play out a pre-recorded announcement (e.g., in the callee's voice) referring to the 30 mins).

Figure 5A:
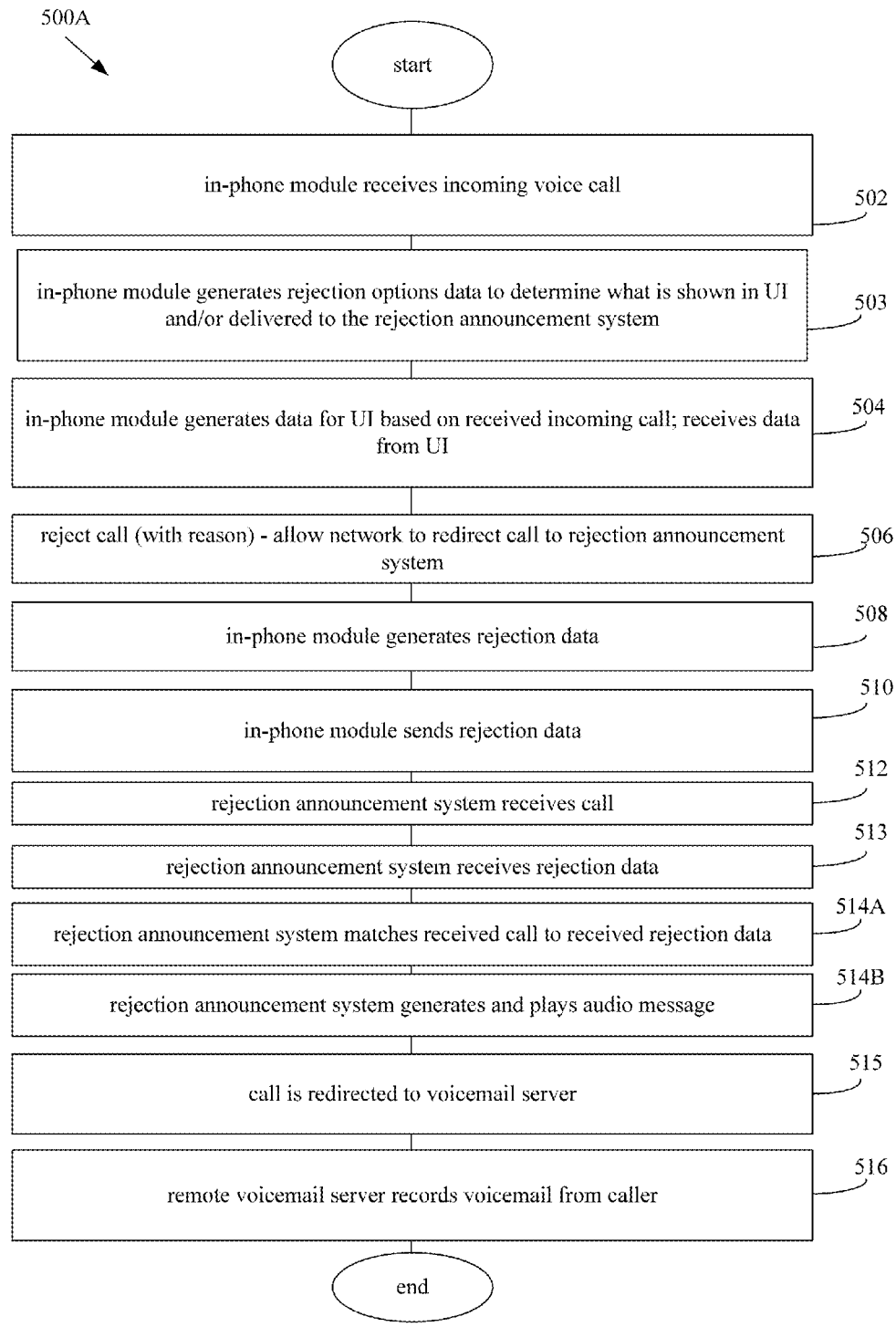
FIGS. 5A, 5B and 5C are flow charts of communications methods provided by the communications systems in FIGS. 1A, 1B and 1C respectively.
Figure 5B:
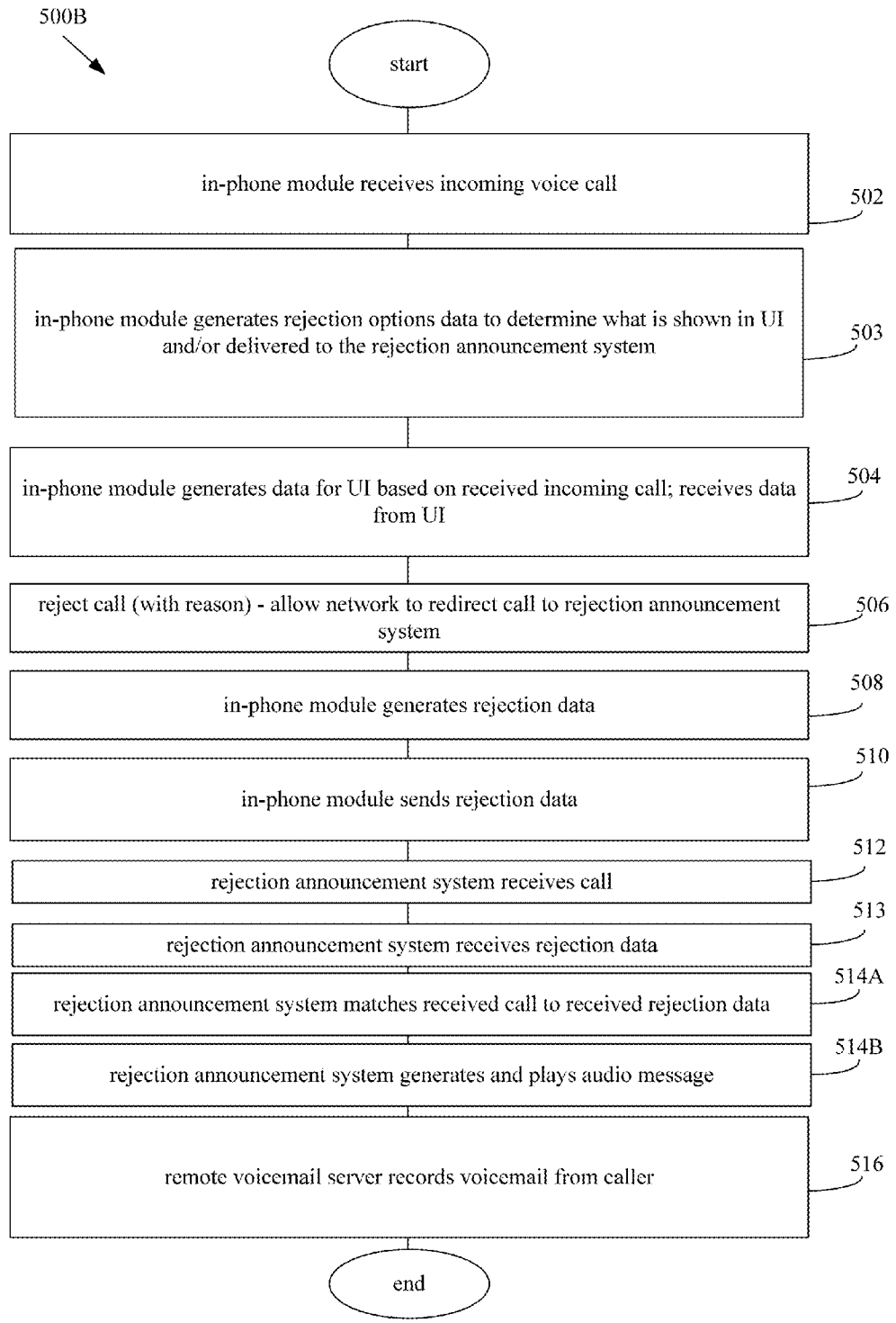
Figure 5C:
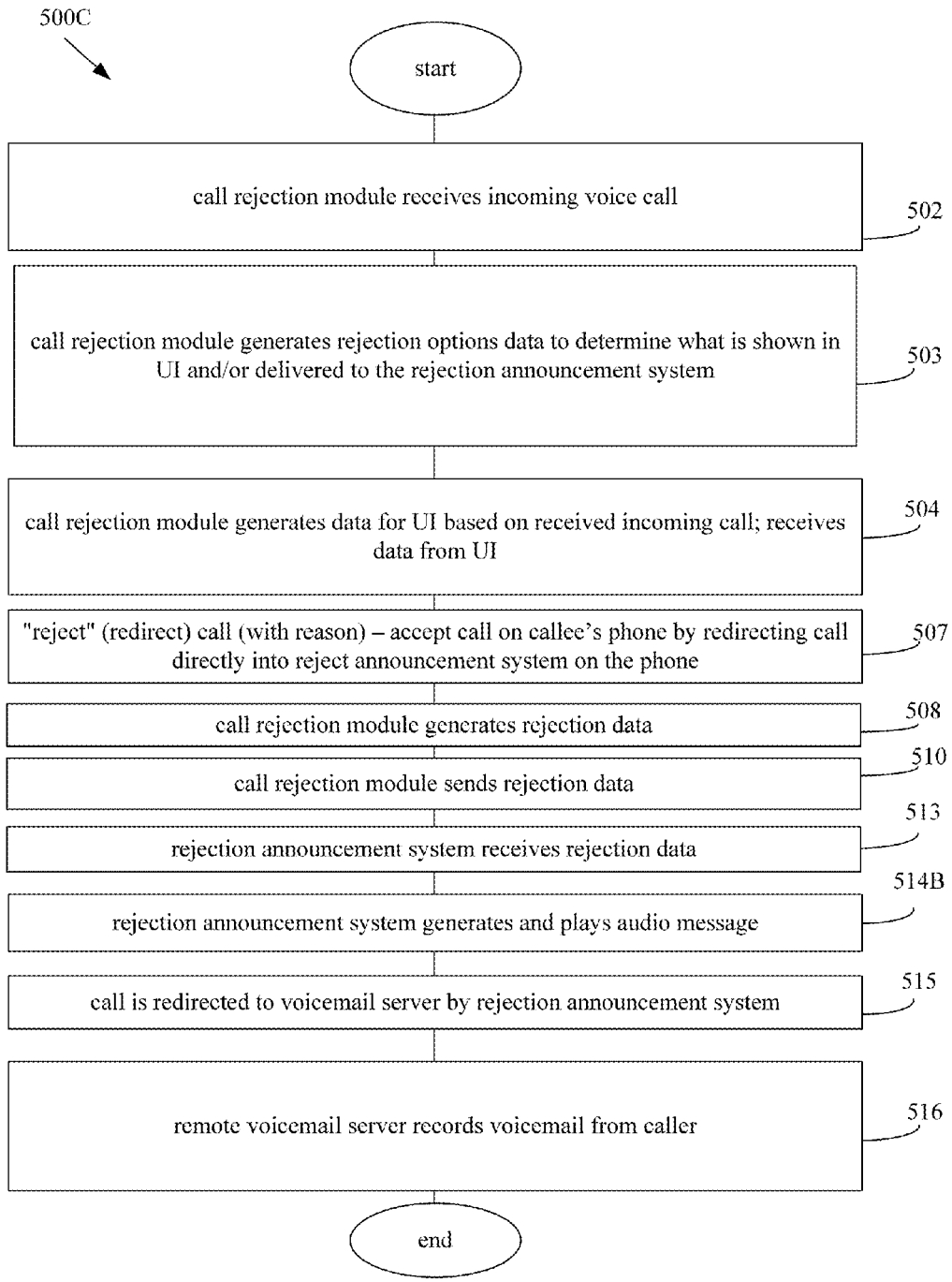

In operation, as shown in FIGS. 5A, 5B and 5C, the systems 100A, 100B and 100C perform communications methods 500A, 500B and 500C respectively (based on the configuration) including the following steps:

the call rejection module 202 receives an incoming voice call request or alert from the caller phone 102 over the voice network 106, e.g., based on a quasi-unique identifier of the call rejection module 202, such as a telephone number, and based on standard ITU/IETF protocols, including the incoming call signalling delivered using the call signalling path in the network 106 (step 502);

the call rejection module 202 generates the rejection options data based on the user preferences data in the phone and/or available data from the standard modules 206 in the phone (step 503);

the call rejection module 202 generates data for the rejection options in at least a portion of an incoming call UI—e.g., the call incoming indicator 402 in the UI 400 is generated based on the incoming voice call—and the call rejection module 202 provides response options for selection by the callee, and receives data from the UI 400 indicating activation of one of the response controls (step 504); in embodiments, the response controls can be actuated using a plurality of user inputs: a first input can initiate a display of the options and change the alert tone (the ringing); and a second input can select one of the displayed options.

in methods 500A and 500B, the call rejection module 202 rejects the voice call from the callee phone 104 to the network 106 in response to selection of one of the reject options, either by sending the voice rejection signal using the call signalling path to the network 106 based on the standard protocols or by waiting for the pre-selected answer time to expire, and allowing the network 106 to redirect the call to the reject announcement system 108 (step 506);

in method 500C, the call rejection module 202 redirects the voice call from the callee phone 104 in response to selection of one of the rejection options to the RAS 108 within the callee phone 104 which accepts the call (step 507);

the call rejection module 202 generates the rejection reason data, representing information (e.g., an unavailability reason, an availability time, an alternate contact, a location, etc.) that may assist the caller, based on available data from the phone and/or the rejection options data, and based on the user's selection of a reject-with-reason option (step 508);

the call rejection module 202 sends the rejection reason data to the reject announcement system 108 either over the connection 114 for methods 500A, 500B (which can be in the rejection reason path that is separate from the call signalling path), or within the phone for method 500C, which can include passing data from module to module, or function to function, in an application (app), or saving and accessing the data in shared memory (step 510);

in methods 500A and 500B, the RAS 108 receives the redirected call (step 512);

the RAS 108 receives the rejection reason data (step 513);

in methods 500A and 500B, the announcement module 312 matches the received rejection reason data to the callee, e.g., based on their phone number (step 514A);

the announcement module 312 generates an audio/video message for the caller based on the rejection reason data, any codes required to decode the rejection message (e.g., in a code dictionary), and optionally based on callee data stored in the callee details database 304 and/or recorded content/sounds/announcements (also referred to as message portions, or stored messages) in the message content database 306, plays the audio/video message for the caller, and based on this rejection reason data generates a confirmation message for the callee phone indicating that the call was rejected and optionally the content of the audio/video message (step 514B);

optionally in methods in 500A and 500C, the call is then redirected to the voicemail server 116 (step 515); and optionally the voicemail server 116 records the voicemail message (which is also referred to as a voicemail) from the caller (step 516).

In the systems 100A and 100B, the calls are redirected from the callee phone 104 and accepted by the announcement system 108 using standard methods in the network 106, e.g., to play out a generic audio/video message. In the separated system 300A, the call is also redirected by the network 106 from the RAS 108 to the voicemail server 116. In the system 300C, the call is redirected from the callee phone 104 to the voicemail server 116 using standard methods in the network 106.

Step 508 may occur before steps 502, 504 and/or 506: thus the rejection reason data can be at least partially pre-generated (e.g., based on the rejection options data, and/or current availability data) before the call is received, thus allowing the rejection reason data to be sent in step 510 quickly once the call is rejected in step 506.

In method 500A and 500B, the rejection reason data can be sent in step 510 to the RAS 108 using the in-band signalling (e.g., session initiation protocol (SIP) signalling if the callee is using VoIP), or the out-of-band signalling (e.g., a separate data communication path from the voice call, which may use a data network separate from the voice network of network 106). The rejection reason data are sent sufficiently quickly (e.g., in less than one second) to the announcement module 312 to allow the audio/video message to be played within a reasonable time of the announcement system 108 receiving the call. In embodiments using the rejection reason path that is separate and independent from the call signalling path, the rejection reason data may include identifying (ID) data, e.g., a callee telephone number and/or a time stamp of the call rejection, which is used by the RAS 108 to correlate (i.e., match) the rejection reason data with the incoming rejected call and/or select the audio/video message for the caller.

In method 500C, the rejection reason data are kept internal to the callee phone 104 in steps 510 and 513.

The call-transfer steps 506, 512 and 507 for rejecting, redirecting and/or receiving the call by the RAS 108 can occur before, after, or contemporaneously with the data-transfer steps 508, 510 and 513 for generating, sending and the receiving the rejection reason data by the RAS 108. The call-transfer and data-transfer steps may overlap with each other, so long as they commence after the callee selects a reject reason and complete before the audio/video message is played to the caller.

The announcement system 108 can include commercially available text-to-speech systems to play out the audio/video message and/or one or more pre-recorded sounds forming portions/parts of the audio/video message, e.g., a pre-recorded comments from the specific callee. An example message could include a callee identifier (ID) or name, and an availability time, e.g., "Hi, this is Peter. According to my calendar, I am busy until 3 pm. Please leave a voicemail message." For pre-recorded comments relating to numerical intervals, the announcement module 312, and/or the call rejection module 202, can process the available data representing numbers (e.g., times or durations) based on logical rules to: (a) approximate specific numbers (e.g., the end time of a meeting, or the duration of an out-of-office message) to correspond to available stored comments in the message content database 306; and (b) aggregate appropriate values (e.g., adjacent busy times in a calendar can be concatenated or summed). For instance, the playout may be pre-set to intervals of the callee being busy for the next "5 minutes", "15 minutes", "30 minutes", "1 hour", "2 hours", or indicate that the callee is busy until "9 am", "10 am", "11 am", etc. These intervals can be spoken by the callee in a recording session prior to the call (or generic recordings could be used), and the sounds can be stored as audio files in the message content database 306. The available recorded intervals may be defined in the user preferences data and used to generate the rejection option data for the labels and the message.

The call rejection module 202 can have a user preference in the user preferences data indicating a default response option. For example, a default reject option can be to select a particular audio/video message, e.g., an out-of-office message. The call rejection module 202 may provide the call incoming indicator 402 if the callee phone 104 is already engaged in a call, and a second incoming call is received, specifically if a "call waiting setting" is selected in the user preferences data.

The callee phone 104 can determine a caller identifier (ID) of the incoming caller's phone (e.g., a telephone number), and use this identifier to select data for the rejection reason data, e.g., by checking if they belong to a pre-defined group (e.g., in a contacts database). If the caller ID is in the pre-defined group, the rejection module 202 can select a different reject control 406, 408, (e.g., an "out of office" message specific for the group) i.e., different options can be presented on the UI 400.

The confirmation message generated for the callee phone 104 can be a short label associated with the audio/video message. The confirmation message is generated by the call rejection module based on confirmation data generated based on the selected reject control. This confirmation data can be the same or equivalent data as the rejection reason data, or separate data generated in response to the control selection. The confirmation message provides confirmation to the callee user that the call rejection module has rejected or redirected the call, and/or that the RAS is playing the audio/video message to the caller. The confirmation message may also represent the available data to indicate the contents of the audio/video message that has been played out to the caller, e.g., exactly how long the caller has been told to wait, or what the caller has been instructed to do. The confirmation message may thus represent the selected reject reason and/or the audio/video message, e.g., the confirmation message may include a short label of text such as "rejecting call with announcement", or "rejecting call: busy for 45 mins". The confirmation message may include visual, audible and/or tactile elements, such as the short label describing the rejection message, or a distinctive vibration sequence. The confirmation message may be stored in confirmation log data in the callee phone 104 so the callee can later review what various callers have been told by the rejection announcement server 108, e.g., before calling the callers back.

Each of the blocks of the flow diagrams of the methods 500A, 500B, 500C (which can be may be provided by a module (including modules 206, 202, 108) or a portion of a module. The processes and modules are provided by computer-executable instructions stored in computer-readable storage, and these computer-executable instructions are configured to control one or more computer processors (e.g., in-phone computer processors, at least for the RAS-in-phone configuration 300C) to execute the steps of at least the communications processes 500A, 500B, 500C. Thus the processes and modules are embodied in a machine-readable and/or computer-readable medium, which is non-transitory, for configuring a computer system to execute the method. The modules may be stored within and/or transmitted to a computer system memory to configure the computer system to perform the functions of the module. The boundaries between the modules and components in the in-phone modules 206, 202, 108 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations. Alternatively, such actions may be embodied in the structure of circuitry that implements such functionality, such as the micro-code of a complex instruction set computer (CISC) or a reduced instruction set computer (RISC), firmware programmed into programmable or erasable/programmable devices, the configuration of a field-programmable gate array (FPGA), the design of a gate array or full-custom application-specific integrated circuit (ASIC), or the like.

Example Embodiments

An example callee phone based on VoIP could operate according to the following.

The example in-phone rejection module performs a background task to maintain the rejection options data. The background task maintains the rejection options data representing the current rejection options by monitoring the available data on the example callee phone (e.g., out-of-office settings, calendar schedules, etc.). The rejection options data can be referred to as including "dynamic data", i.e., data that changes based on the current system time (e.g., a next-free time). The current rejection options can define the next available free time based on available calendar entries in the example callee phone. The background task can also partially prepare the rejection options data, and the rejection reason data, e.g., based on the rejection options data and the available data.

For an incoming call, the example callee phone displays additional buttons for reject-with-specific-reason options, or provides a control to reveal the additional call reject-with-reason options (e.g., as a drop-down selection), or plays the options audibly. The controls are labelled with example labels from the rejection options data. The example labels may include dynamic data, e.g., based on the current rejection options data, such as "busy—free at 3 pm", where the "3 pm" is generated based on the system time and an aggregate of the calendar durations/times by the background task. The buttons display the example labels, which can be pre-defined by the user. The example labels (e.g., "Busy—Free at 3 pm") are a representation of the reject reason that are brief/short to fit in the example UI (e.g., being limited to a selected number of text characters, or a selected display size, or a selected duration for an audio label). The rejection reason data also represent example rejection messages (e.g., "I'm busy at the moment, but will be free at 3 pm") for sending in the rejection reason data that are more extensive than the associated labels.

If the user selects one of the call-reject-with-reason options, then the example callee phone generates the rejection reason data representing the actual message to be sent, and inserts the rejection reason data into the SIP signalling.

The example network redirects the call to an example announcement module, which:
  receives the incoming call;
  checks the original called number (i.e., the callee ID);
  checks the rejection message in the rejection reason data; and
  checks the callee ID's settings in preferences data in the example RAS.

If the received reject reason matches a preset reason that is associated with a preset voice recording, the example announcement module plays that preset recorded message; else if the reject reason has a dynamic component (e.g., time), and the settings show prerecorded times, then the example announcement system maps the given time to the closest pre-recorded time, and plays that announcement; else the example announcement system uses a standard text-to-speech system to read out the message.

After the message playout is complete, the example announcement system forwards the call to an example voicemail system.

An alternative example system could be implemented where the RAS 108 is implemented in a callee mobile smartphone as part of an Android VoIP app (Android version 4.0 and above), according to the following.

The example callee mobile smartphone app accesses calendar data on the callee's mobile smartphone using standard Android Calendar Provider APIs, whether such calendar information is stored locally, or accessed from the cloud (e.g., using Exchange ActiveSync, and/or Google Calendar).

Incoming calls cause the example app to display standard and normal accept and reject call options, together with a Reject Assistant pull up tray or control. If the user selects this tray, the example app causes reject options to appear for the user to select, and the ringing changes (e.g., to vibrate).

The reject options provided include two or more predefined messages including "I'll phone you back", and "Can you send a message?"

In addition, the example app causes reject options to be displayed based on the user's calendar entries. If the user does not have a current calendar entry, then "I'm busy for the next 20 minutes" is generated and displayed as an option. If the user does have a calendar entry covering the current time, then an option is generated and displayed showing the time to the end of the current calendar/meeting entry, e.g., "I'm busy for the next 45 minutes". If the user has back-to-back calendar entries, then another option is provided with a timeframe corresponding to the end of the back-to-back meetings, e.g., "I'm busy for the next 135 minutes". The generated option can thus be generated using an aggregate (e.g., a summation or a concatenation) of the durations/times of the plurality of calendar entries.

If the user selects a reject reason for an incoming call, the example app causes the call to be accepted onto the phone, and causes an example audio/video message to be played out to the caller. This call does not use the callee phone's microphone or speaker. Furthermore, the example app causes an example visual confirmation message to be generated and displayed on the example callee phone based on the selected option. The example confirmation message indicates that one of the rejection-with-reason options has been selected, e.g., "rejecting with announcement".

The audio of the played-out message can be pre-generated using a text-to-speech system (e.g., using the commercially available Acapela text-to-speech engine offline), and can be stored with or in the example app (e.g., pre-generated audio files can be stored in a file store on the callee phone 108). In the case of calendar-based reject messages, the audio that is played out is a combination of audio files, consisting of pre-defined messages, together with separate portions generated using a text-to-speech conversion of the time. The time used for the audio/video message and the visual message is rounded to discrete values (e.g., 5 mins, 10 mins) by the example app. The separate audio segments or portions that play out the static parts of the audio/video messages and the various available/possible time values can be pre-generated using the text-to-speech system and stored in the phone 108. At the time of the making the announcement (i.e., playing out the audio/video message), example the RAS accesses the selected files for the message, concatenates them based on the rejection reason data (e.g., selecting a static portion based on the rejection option, and a time portion based on calendar data), and plays out the concatenated audio/video message: for example, a static portion "the person you have called is not available for the next" can be concatenated with a selected time portion "45 minutes" and a further static portion "but is able to contact you thereafter" to create an example audio/video message. The audio/video message can be generated based on the rejection reason data, which can represent the selected reject option. The audio/video message can be generated using an aggregate (e.g., a summation or a concatenation) of the durations of the plurality of calendar entries.

The played-out messages are longer than the short label provided in the callee user interface. For instance, the played out message for the calendar entry may be "The person you have called is not available for the next 45 minutes, but is able to read voicemails. Please stay on the line to be directed to voicemail".

At the end of the playout of the reject announcement message, the call is redirected to the voicemail server, allowing the caller to leave a voicemail as per normal.

Interpretation

Many modifications will be apparent to those skilled in the art without departing from the scope of the present invention.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The claims defining the invention are as follows:

1. A system including:
   a rejection module in a phone configured to receive calls over a network; and
   a remote rejection announcement server (RAS) configured to receive calls over the network,
   wherein the rejection module is configured to:
      generate at least a portion of an incoming call user interface (UI) on the phone, said UI indicating incoming call signalling, associated with an incoming call from a caller, over a call signalling path in the network;
      provide one or more rejection options for selection by a user of the phone;
      generate rejection reason data based on selection of one of the rejection options; and
      send the rejection reason data using a rejection reason path that is separate from the call signalling path, and
   wherein the remote RAS is configured to:
      receive the incoming call from the caller;
      receive the rejection reason data over the rejection reason path; and
      generate, based on the rejection reason data, an audio/video message for the caller,
   wherein the rejection options and/or the rejection reason data are generated based on user availability data, representing when the user is available, which is generated using calendar data from the phone, and
   wherein the rejection reason data represent a plurality of calendar entries, and the audio/video message represents times or durations of the plurality of calendar entries.

2. The system of claim 1, wherein the audio/video message represents an aggregate of the durations of the plurality of calendar entries.

3. The system of claim 1, wherein the rejection options and/or the rejection reason data are generated based on available data on the phone including any one or more of:
   predefined message data representing predefined rejection messages;
   personal contact data available on the phone;
   location data available on the phone representing a current location of the phone;
   status data available on the phone representing a current status of the user; and
   presence data available on the phone representing a presence of the user.

4. The system of claim 3, wherein the available data are stored on the phone or are available on the phone from a remote server.

5. The system of claim 1,
   wherein the rejection module is configured to detect the incoming call over the network,
   wherein the incoming call includes a request for an audio call or a video call, and
   wherein the rejected call is redirected to the RAS by the network.

6. The system of claim 1, including a voicemail server configured to receive the call from the RAS after the audio/video message is played for the caller.

7. The system of claim 1, wherein the RAS is in a voicemail server in communication with the network.

8. The system of claim 1, wherein the rejection module is configured to generate a confirmation message for display by the phone representing the selected one of the rejection options and/or the rejection reason data.

9. A communications method including the steps of:
   indicating incoming call signalling, associated with an incoming call from a caller, over a call signalling path in a network by generating at least a portion of an incoming call user interface (UI) on a phone;
   providing one or more rejection options for selection by a user of the phone;
   generating rejection reason data based on selection of one of the rejection options;
   sending the rejection reason data using a rejection reason path that is separate from the call signalling path;
   receiving the incoming call from the caller at a remote rejection announcement system (RAS);
   receiving the rejection reason data at the remote RAS over the rejection reason path;
   generating, based on the rejection reason data, an audio/video message for the caller; and
   generating the rejection options and/or the rejection reason data based on user availability data, representing when the user is available, which is generated using calendar data from the phone,
   wherein the rejection reason data represent a plurality of calendar entries, and the audio/video message represents times or durations of the plurality of calendar entries.

10. The communications method of claim 9, wherein the audio/video message represents an aggregate of the durations of the plurality of calendar entries.

11. The communications method of claim 9, including receiving a voicemail message after playing the audio/video message for the caller.

12. The communications method of claim 9, including the steps of:
   receiving a request on the phone to accept the incoming call from the caller; and
   accepting the rejected call at the RAS.

13. The communications method of claim 9, including generating a confirmation message for display by the phone representing the selected one of the rejection options and/or rejection reason data.

14. A non-transitory, machine readable medium having stored thereon instructions for a communications method, the stored instructions comprising machine executable code, which when executed by at least one machine processor, causes the machine processor to:
   indicate incoming call signalling, associated with an incoming call from a caller, over a call signalling path in a network by generating at least a portion of an incoming call user interface (UI) on a phone;
   provide one or more rejection options for selection by a user of the phone;
   generate rejection reason data based on selection of one of the rejection options;
   send the rejection reason data using a rejection reason path that is separate from the call signalling path;
   receive the incoming call from the caller at a remote rejection announcement system (RAS);
   receive the rejection reason data at the remote RAS over the rejection reason path;
   generate, based on the rejection reason data, an audio/video message for the caller; and
   generate the rejection options and/or the rejection reason data based on user availability data, representing when the user is available, using calendar data from the phone, wherein the rejection reason data represent a plurality of calendar entries, and the audio/video message represents times or durations of the plurality of calendar entries.

15. A system including:
a rejection module in a phone configured to receive calls over a network; and
a remote rejection announcement server (RAS) configured to receive calls over the network,
wherein the rejection module is configured to:
generate at least a portion of an incoming call user interface (UI) on the phone, said UI indicating incoming call signalling, associated with an incoming call from a caller, over a call signalling path in the network;
provide one or more rejection options for selection by a user of the phone;
generate rejection reason data based on selection of one of the rejection options; and
send the rejection reason data using a rejection reason path that is separate from the call signalling path, and
wherein the remote RAS is configured to:
receive the incoming call from the caller;
receive the rejection reason data over the rejection reason path; and
generate, based on the rejection reason data, an audio/video message for the caller,
wherein the rejection reason path is an Internet Protocol (IP) path, and the incoming call signalling is based on a circuit-switched protocol or a packet-switched protocol, and wherein the rejection module is configured to send a voice rejection signal to the network over a voice-rejection path based on the circuit-switched protocol or the packet-switched protocol indicating the rejection of the incoming call from the phone.

16. The system of claim 15, wherein the rejection options and/or the rejection reason data are generated based on user availability data, representing when the user is available, which is generated using calendar data from the phone.

17. The system of claim 16, wherein the rejection reason data represent a plurality of calendar entries, and the audio/video message represents times or durations of the plurality of calendar entries.

18. The system of claim 17, wherein the audio/video message represents an aggregate of the durations of the plurality of calendar entries.

19. The system of claim 15, wherein the rejection options and/or the rejection reason data are generated based on available data on the phone including any one or more of:
predefined message data representing predefined rejection messages;
personal contact data available on the phone;
location data available on the phone representing a current location of the phone;
status data available on the phone representing a current status of the user; and
presence data available on the phone representing a presence of the user.

20. The system of claim 19, wherein the available data are stored on the phone or are available on the phone from a remote server.

21. The system of claim 15,
wherein the rejection module is configured to detect the incoming call over the network,
wherein the incoming call includes a request for an audio call or a video call, and
wherein the rejected call is redirected to the RAS by the network.

22. The system of claim 15, including a voicemail server configured to receive the call from the RAS after the audio/video message is played for the caller.

23. The system of claim 15, wherein the RAS is in a voicemail server in communication with the network.

24. The system of claim 15, wherein the rejection module is configured to generate a confirmation message for display by the phone representing the selected one of the rejection options and/or the rejection reason data.

25. A communications method including the steps of:
indicating incoming call signalling, associated with an incoming call from a caller, over a call signalling path in a network by generating at least a portion of an incoming call user interface (UI) on a phone;
providing one or more rejection options for selection by a user of the phone;
generating rejection reason data based on selection of one of the rejection options;
sending the rejection reason data using a rejection reason path that is separate from the call signalling path;
receiving the incoming call from the caller at a remote rejection announcement system (RAS);
receiving the rejection reason data at the remote RAS over the rejection reason path; and
generating, based on the rejection reason data, an audio/video message for the caller, wherein the rejection reason path is an Internet Protocol (IP) path, and the incoming call signalling is based on a circuit-switched protocol or a packet-switched protocol, and including sending a voice rejection signal to the network over a voice-rejection path based on the circuit-switched protocol or the packet-switched protocol indicating the rejection of the incoming call from the phone.

26. The communications method of claim 25, including generating the rejection options and/or the rejection reason data based on user availability data, representing when the user is available, which is generated using calendar data from the phone.

27. The communications method of claim 26, wherein the rejection reason data represent a plurality of calendar entries, and the audio/video message represents times or durations of the plurality of calendar entries.

28. The communications method of claim 27, wherein the audio/video message represents an aggregate of the durations of the plurality of calendar entries.

29. The communications method of claim 25, including receiving a voicemail message after playing the audio/video message for the caller.

30. The communications method of claim 25, including the steps of:
receiving a request on the phone to accept the incoming call from the caller; and
accepting the rejected call at the RAS.

31. The communications method of claim 25, including generating a confirmation message for display by the phone representing the selected one of the rejection options and/or rejection reason data.

32. A non-transitory, machine readable medium having stored thereon instructions for a communications method, the stored instructions comprising machine executable code, which when executed by at least one machine processor, causes the machine processor to:
indicate incoming call signalling, associated with an incoming call from a caller, over a call signalling path in a network by generating at least a portion of an incoming call user interface (UI) on a phone;

provide one or more rejection options for selection by a user of the phone;

generate rejection reason data based on selection of one of the rejection options;

send the rejection reason data using a rejection reason path that is separate from the call signalling path, wherein the rejection reason path is an Internet Protocol (IP) path, and the incoming call signalling is based on a circuit-switched protocol or a packet-switched protocol;

send a voice rejection signal to the network over a voice-rejection path based on the circuit-switched protocol or the packet-switched protocol indicating the rejection of the incoming call from the phone;

receive the incoming call from the caller at a remote rejection announcement system (RAS);

receive the rejection reason data at the remote RAS over the rejection reason path; and generate, based on the rejection reason data, an audio/video message for the caller.

\* \* \* \* \*